(12) United States Patent
Takahashi et al.

(10) Patent No.: US 6,271,881 B1
(45) Date of Patent: Aug. 7, 2001

(54) COLOR IMAGE PICKUP APPARATUS FOR PROGRESSIVE SCANNING VIDEO SIGNAL

(75) Inventors: Yuichirou Takahashi, Sagamihara; Atsuto Kanazawa, Tokyo; Masaki Kariya, Yokohama; Masayuki Serizawa, Yokohama; Kenji Tamura, Yokohama; Kikuo Kobayashi, Yokohama; Masaaki Nakayama; Hiromichi Tanaka, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/066,783

(22) Filed: Apr. 27, 1998

(30) Foreign Application Priority Data

May 30, 1997 (JP) .................................................. 9-142728

(51) Int. Cl.$^7$ ................................. H04N 3/14; H04N 7/01
(52) U.S. Cl. ......................... 348/279; 348/237; 348/446; 348/713; 358/515
(58) Field of Search ................................... 348/207, 222, 348/223, 224, 234, 235, 236, 237, 266, 267, 272, 273, 275, 277, 278, 279, 441, 446, 448, 663, 708, 712, 713; 382/162, 165, 166, 167; 358/515, 516, 518, 482, 483; H04N 3/14, 7/01

(56) References Cited

U.S. PATENT DOCUMENTS

| | | | |
|---|---|---|---|
| 4,513,312 | * 4/1985 | Takemura | 348/277 |
| 5,285,267 | 2/1994 | Lim | 348/663 |
| 5,497,199 | * 3/1996 | Asada | 348/448 |
| 5,537,154 | * 7/1996 | Ahn | 348/629 |
| 5,581,357 | 12/1996 | Sasaki et al. | 348/235 |
| 5,614,947 | 3/1997 | Yoneyama et al. | 348/241 |
| 5,880,781 | * 3/1999 | Udagawa | 348/279 |
| 5,978,023 | * 11/1999 | Glenn | 348/273 |
| 6,133,953 | * 10/2000 | Okada | 348/279 |
| 6,144,412 | * 11/2000 | Hirano | 348/448 |

FOREIGN PATENT DOCUMENTS

| | | | |
|---|---|---|---|
| 0762 747 | 3/1997 | (EP) | H04N/5/335 |
| 7-7733 | 1/1995 | (JP) | H04N/9/04 |

\* cited by examiner

Primary Examiner—Wendy R. Garber
Assistant Examiner—Ngoc-Yen Vu
(74) Attorney, Agent, or Firm—Connolly Bove Lodge & Hutz LLP (57) ABSTRACT

A color image pickup apparatus includes a photo-to-electric conversion section subjected to progressive scanning. A first delay circuit defers an output signal of the photo-to-electric conversion section. A first adder combines the output signal of the photo-to-electric conversion section and an output signal of the first delay circuit. A second delay circuit defers the output signal of the first delay circuit. A second adder combines the output signal of the photo-to-electric conversion section and an output signal of the second delay circuit. A third delay circuit defers an output signal of the first adder. A first subtracter implements subtraction between the output signal of the first adder and an output signal of the third delay circuit. A fourth delay circuit defers an output signal of the second adder. A second subtracter implements subtraction between the output signal of the second adder and an output signal of the fourth delay circuit. A first sign change circuit inverts a sign of an output signal of the first subtracter. A first selector periodically and alternately selects one of the output signal of the first subtracter and an output signal of the first sign change circuit. A second sign change circuit inverts a sign of an output signal of the second subtracter. A second selector periodically and alternately selects one of the output signal of the second subtracter and an output signal of the second sign change circuit. Two different color-difference signals are generated in response to an output signal of the first selector and an output signal of the second selector.

4 Claims, 8 Drawing Sheets

| | | | | | | | |
|---|---|---|---|---|---|---|---|
| OUTPUT "α" OF SUBTRACTER 7 | −CR1111 | CR2211 | −CR2222 | CR3322 | −CR3333 | CR4433 | −CR4444 |
| OUTPUT OF SIGN CHANGE CIRCUIT 12 | CR1111 | −CR2211 | CR2222 | −CR3322 | CR3333 | −CR4433 | CR4444 |
| OUTPUT OF SWITCH 14 | CR1111 | CR2211 | CR2222 | CR3322 | CR3333 | CR4433 | CR4444 |
| OUTPUT "β" OF SUBTRACTER 11 | | CB1211 | −CB2212 | CB2322 | −CB3323 | CB3433 | −CB4434 | CB4544 |
| OUTPUT OF SIGN CHANGE CIRCUIT 13 | | −CB1211 | CB2212 | −CB2322 | CB3323 | −CB3433 | CB4434 | −CB4544 |
| OUTPUT OF SWITCH 15 | | CB1211 | CB2212 | CB2322 | CB3323 | CB3433 | CB4434 | CB4544 |

TIME →

| | | | | | | |
|---|---|---|---|---|---|---|
| OUTPUT "α" OF SUBTRACTER 27 | −CR1111 | CR2211 | −CR2222 | CR3322 | −CR3333 | CR4433 | −CR4444 |
| OUTPUT OF SIGN CHANGE CIRCUIT 33 | CR1111 | −CR2211 | CR2222 | −CR3322 | CR3333 | −CR4433 | CR4444 |
| OUTPUT OF SWITCH 35 | CR1111 | CR2211 | CR2222 | CR3322 | CR3333 | CR4433 | CR4444 |
| OUTPUT "β" OF SUBTRACTER 32 | CB1221 | −CB2222 | CB2332 | −CB3333 | CB3443 | −CB4444 | CB4554 |
| OUTPUT OF SIGN CHANGE CIRCUIT 34 | −CB1221 | CB2222 | −CB2332 | CB3333 | −CB3443 | CB4444 | −CB4554 |
| OUTPUT OF SWITCH 36 | CB1221 | CB2222 | CB2332 | CB3333 | CB3443 | CB4444 | CB4554 |

TIME →

COLOR IMAGE PICKUP APPARATUS FOR PROGRESSIVE SCANNING VIDEO SIGNAL

BACKGROUND OF THE INVENTION

1. Field of the Invention

This invention relates to a color image pickup apparatus or a color camera apparatus.

2. Description of the Related Art

A known color CCD (charge-coupled device) camera includes a two-dimensional array of photosensitive diodes, and a checkered color separation filter extending in front of the photosensitive diode array, and a CCD array connected to the photosensitive diode array.

Japanese published unexamined patent application 7-7733 discloses such a color CCD camera. The camera of Japanese application 7-7733 is designed for interlaced scanning. Thus, in the camera of Japanese application 7-7733, a color separation filter has a pattern suited to interlaced scanning.

If a prior-art combination of a photosensitive diode array, a CCD array, and a color separation filter designed for interlaced scanning is driven in a progressive scanning procedure, a vertical-direction color resolution provided by a resultant image-representing signal tends to be significantly decreased.

SUMMARY OF THE INVENTION

It is an object of this invention to provide an improved color image pickup apparatus which operates in a progressive scanning procedure.

A first aspect of this invention provides a color image pickup apparatus comprising a photo-to-electric conversion section subjected to progressive scanning; a first delay circuit for delaying an output signal of the photo-to-electric conversion section; a first adder for adding the output signal of the photo-to-electric conversion section and an output signal of the first delay circuit; a second delay circuit for delaying the output signal of the first delay circuit; a second adder for adding the output signal of the photo-to-electric conversion section and an output signal of the second delay circuit; a third delay circuit for delaying an output signal of the first adder; a first subtracter for implementing subtraction between the output signal of the first adder and an output signal of the third delay circuit; a fourth delay circuit for delaying an output signal of the second adder; a second subtracter for implementing subtraction between the output signal of the second adder and an output signal of the fourth delay circuit; a first sign change circuit for inverting a sign of an output signal of the first subtracter; a first selector for periodically and alternately selecting one of the output signal of the first subtracter and an output signal of the first sign change circuit; a second sign change circuit for inverting a sign of an output signal of the second subtracter; a second selector for periodically and alternately selecting one of the output signal of the second subtracter and an output signal of the second sign change circuit; and means for generating two different color-difference signals in response to an output signal of the first selector and an output signal of the second selector.

A second aspect of this invention provides a color image pickup apparatus comprising a photo-to-electric conversion section subjected to progressive scanning; a first delay circuit for delaying an output signal of the photo-to-electric conversion section; a first adder for adding the output signal of the photo-to-electric conversion section and an output signal of the first delay circuit; a second delay circuit for delaying the output signal of the first delay circuit; a second adder for adding the output signal of the photo-to-electric conversion section and an output signal of the second delay circuit; a third delay circuit for delaying the output signal of the photo-to-electric conversion section; a third adder for adding the output signal of the first delay circuit and an output signal of the third delay circuit; a fourth delay circuit for delaying an output signal of the first adder; a first subtracter for implementing subtraction between the output signal of the first adder and an output signal of the fourth delay circuit; a second subtracter for implementing subtraction between an output signal of the second adder and an output signal of the third adder; a first sign change circuit for inverting a sign of an output signal of the first subtracter; a first selector for periodically and alternately selecting one of the output signal of the first subtracter and an output signal of the first sign change circuit; a second sign change circuit for inverting a sign of an output signal of the second subtracter; a second selector for periodically and alternately selecting one of the output signal of the second subtracter and an output signal of the second sign change circuit; and means for generating two different color-difference signals in response to an output signal of the first selector and an output signal of the second selector.

A third aspect of this invention provides a color image pickup apparatus comprising a photo-to-electric conversion section subjected to progressive scanning; a first delay circuit for delaying an output signal of the photo-to-electric conversion section by a time equal to one horizontal scanning period; a first adder for adding the output signal of the photo-to-electric conversion section and an output signal of the first delay circuit; a second delay circuit for delaying the output signal of the first delay circuit by a time corresponding to one pixel; a second adder for adding the output signal of the photo-to-electric conversion section and an output signal of the second delay circuit; a third delay circuit for delaying an output signal of the first adder by a time corresponding to one pixel; a first subtracter for implementing subtraction between the output signal of the first adder and an output signal of the third delay circuit; a fourth delay circuit for delaying an output signal of the second adder by a time correspond to one pixel; a second subtracter for implementing subtraction between the output signal of the second adder and an output signal of the fourth delay circuit; a first sign change circuit for inverting a sign of an output signal of the first subtracter; a first selector for periodically and alternately selecting one of the output signal of the first subtracter and an output signal of the first sign change circuit; a second sign change circuit for inverting a sign of an output signal of the second subtracter; a second selector for periodically and alternately selecting one of the output signal of the second subtracter and an output signal of the second sign change circuit; and means for generating two different color-difference signals in response to an output signal of the first selector and an output signal of the second selector.

A fourth aspect of this invention provides a color image pickup apparatus comprising a photo-to-electric conversion section subjected to progressive scanning; a first delay circuit for delaying an output signal of the photo-to-electric conversion section by a time equal to one horizontal scanning period; a first adder for adding the output signal of the photo-to-electric conversion section and an output signal of the first delay circuit; a second delay circuit for delaying the output signal of the first delay circuit by a time corresponding to one pixel; a second adder for adding the output signal of the photo-to-electric conversion section and an output signal of the second delay circuit; a third delay circuit for delaying the output signal of the photo-to-electric conversion section by a time corresponding to one pixel; a third adder for adding the output signal of the first delay circuit and an output signal of the third delay circuit; a fourth delay circuit for delaying an output signal of the first adder by a time corresponding to one pixel; a first subtracter for implementing subtraction between the output signal of the first adder and an output signal of the fourth delay circuit; a second subtracter for implementing subtraction between an output signal of the second adder and an output signal of the third adder; a first sign change circuit for inverting a sign of an output signal of the first subtracter; a first selector for periodically and alternately selecting one of the output signal of the first subtracter and an output signal of the first sign change circuit; a second sign change circuit for inverting a sign of an output signal of the second subtracter; a second selector for periodically and alternately selecting one of the output signal of the second subtracter and an output signal of the second sign change circuit; and means for generating two different color-difference signals in response to an output signal of the first selector and an output signal of the second selector.

DESCRIPTION OF THE PREFERRED EMBODIMENTS

First Embodiment

Figure 1:
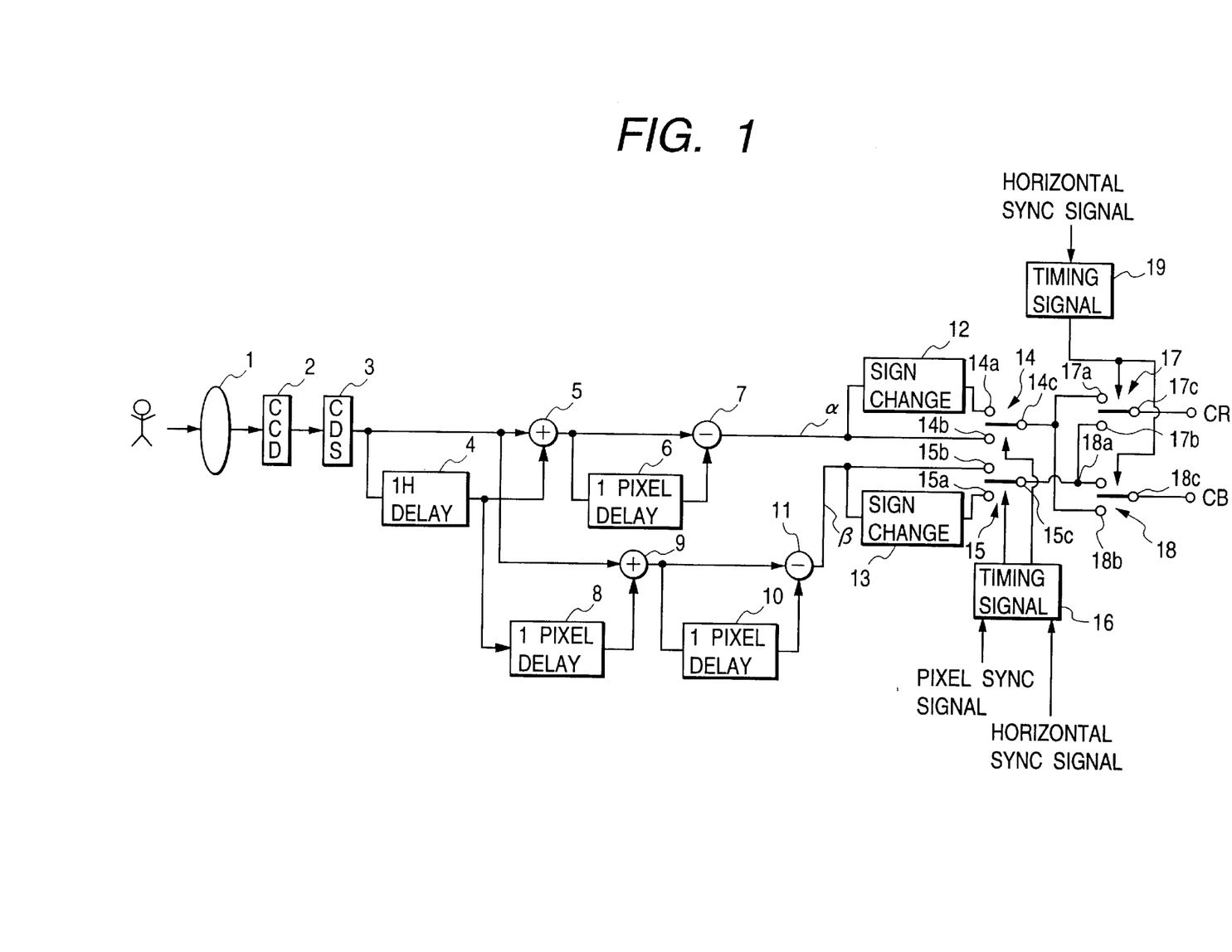
FIG. 1 is a block diagram of a color camera apparatus according to a first embodiment of this invention.

FIG. 1 shows a color camera apparatus (a color image pickup apparatus) according to a first embodiment of this invention. The color camera apparatus of FIG. 1 has an optical section 1, a photo-to-electric conversion section (a CCD-based image pickup section) 2, and a signal processing section.

The optical section 1 focuses light from the scene onto the surface of a photosensitive diode array in the photo-to-electric conversion section 2. Thus, an image of the scene is developed at the surface of the photosensitive diode array.

The photo-to-electric conversion section 2 includes a two-dimensional array of photosensitive diodes, and a checkered color separation filter extending in front of the photosensitive diode array, and a CCD (charge-coupled device) array connected to the photosensitive diode array. The light from the scene passes through the color separation filter before forming the image of the scene at the surface of the photosensitive diode array. The photosensitive diodes convert the corresponding segments of the image into electric signals. The photosensitive diode array is subjected to known progressive scanning. Thus, the photosensitive diode array is progressively scanned line-by-line. The electric signals generated by the photosensitive diodes are sequentially transmitted therefrom by the CCD array, and are multiplexed and combined into a first color picture signal. The photo-to-electric conversion section 2 outputs the first color picture signal to the signal processing section.

Figure 2:
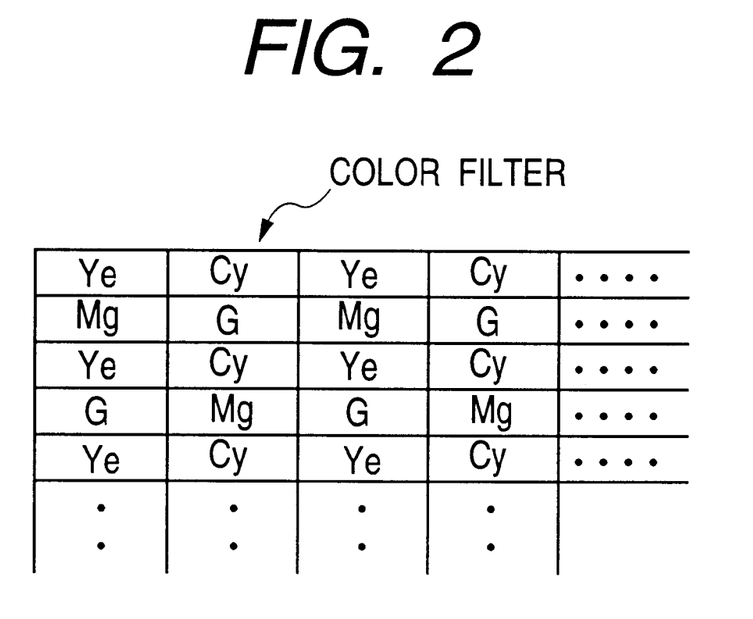
FIG. 2 is a diagram of a color filter in a photo-electric conversion section of the color camera apparatus of FIG. 1.

As shown in FIG. 2, the color separation filter in the photo-electric conversion section 2 has a checkered structure. The color separation filter is divided into rectangular segments which are assigned to the photosensitive diodes respectively, and which form color separation elements respectively. The rectangular segments of the color separation filter are defined as corresponding to pixels respectively. A given number of horizontal lines compose the whole area of the color separation filter. Each of the horizontal lines has a predetermined number of rectangular segments. The horizontal lines are sequentially numbered along a vertical direction in a conventional way.

As shown in FIG. 2, the first horizontal line starts from a yellow segment Ye, and has the alternation of yellow segments Ye and cyan segments Cy. The second horizontal line starts from a magenta segment Mg, and has the alternation of magenta segments Mg and green segments G. The third horizontal line starts from a yellow segment Ye, and has the alternation of yellow segments Ye and cyan segments Cy. The fourth horizontal line starts from a green segment G, and has the alternation of green segments G and magenta segments Mg. The first, second, third, and fourth horizontal lines form a unit group. The fifth and later horizontal lines form periodical recurrences of unit groups.

With reference back to FIG. 1, the signal processing section includes a CDS (correlation double sampling, or correlation dual sampling) circuit 3 which follows the photo-to-electric conversion section 2. The CDS circuit 3 receives the output signal of the photo-to-electric conversion section 2. The CDS circuit 3 subjects the output signal of the photo-to-electric conversion section 2 to a known correlation double sampling process or a known correlation dual sampling process, thereby reducing random noise therein. Accordingly, the CDS circuit 3 generates a noise-reduced picture signal from the output signal of the photo-to-electric conversion section 2. The noise-reduced picture signal is referred to as the second picture signal. The CDS circuit 3 outputs the second picture signal to a later stage.

The signal processing section also includes a delay circuit 4, an adder 5, a delay circuit 6, a subtracter 7, a delay circuit 8, an adder 9, a delay circuit 10, a subtracter 11, sign change circuits 12 and 13, switches 14 and 15, and a timing signal generator 16. The input terminal of the delay circuit 4 is connected to the output terminal of the CDS circuit 3. A first input terminal of the adder 5 is connected to the output terminal of the CDS circuit 3. A second input terminal of the adder 5 is connected to the output terminal of the delay circuit 4. The input terminal of the delay circuit 6 is connected to the output terminal of the adder 5. A first input terminal of the subtracter 7 is connected to the output terminal of the adder 5. A second input terminal of the subtracter 7 is connected to the output terminal of the delay circuit 6. The input terminal of the sign change circuit 12 is connected to the output terminal of the subtracter 7.

The switch 14 has first and second fixed contacts 14a and 14b, a movable contact 14c, and a control terminal. The movable contact 14c selectively connects with one of the first and second fixed contacts 14a and 14b in response to a signal applied to the control terminal. The first fixed contact 14a is connected to the output terminal of the sign change circuit 12. The second fixed contact 14b is connected to the output terminal of the subtracter 7. The timing signal generator 16 receives a pixel sync signal which has pulses synchronized with 1-pixel-corresponding time intervals respectively. Also, the timing signal generator 16 receives a horizontal sync signal. A first output terminal of the timing signal generator 16 is connected to the control terminal of the switch 14.

The input terminal of the delay circuit 8 is connected to the output terminal of the delay circuit 4. A first input terminal of the adder 9 is connected to the output terminal of the CDS circuit 3. A second input terminal of the adder 9 is connected to the output terminal of the delay circuit 8. The input terminal of the delay circuit 10 is connected to the output terminal of the adder 9. A first input terminal of the subtracter 11 is connected to the output terminal of the adder 9. A second input terminal of the subtracter 11 is connected to the output terminal of the delay circuit 10. The input terminal of the sign change circuit 13 is connected to the output terminal of the subtracter 11.

The switch 15 has first and second fixed contacts 15a and 15b, a movable contact 15c, and a control terminal. The movable contact 15c selectively connects with one of the first and second fixed contacts 15a and 15b in response to a signal applied to the control terminal. The first fixed contact 15a is connected to the output terminal of the sign change circuit 13. The second fixed contact 15b is connected to the output terminal of the subtracter 11. The control terminal of the switch 15 is connected to a second output terminal of the timing signal generator 16.

With reference to FIG. 1, the signal processing section further includes switches 17 and 18, and a timing signal generator 19. The timing signal generator 19 receives the horizontal sync signal. The timing signal generator 19 includes, for example, a cascade combination of two bistable multivibrators which responds to the horizontal sync signal.

The switch 17 has first and second fixed contacts 17a and 17b, a movable contact 17c, and a control terminal. The movable contact 17c selectively connects with one of the first and second fixed contacts 17a and 17b in response to a signal applied to the control terminal. The first fixed contact 17a is connected to the movable contact 14c of the switch 14. The second fixed contact 17b is connected to the movable contact 15c of the switch 15. The control terminal of the switch 17 is connected to the output terminal of the timing signal generator 19.

The switch 18 has first and second fixed contacts 18a and 18b, a movable contact 18c, and a control terminal. The movable contact 18c selectively connects with one of the first and second fixed contacts 18a and 18b in response to a signal applied to the control terminal. The first fixed contact 18a is connected to the movable contact 15c of the switch 15. The second fixed contact 18b is connected to the movable contact 14c of the switch 14. The control terminal of the switch 18 is connected to the output terminal of the timing signal generator 19.

The signal processing section operates as follows. The delay circuit 4 receives the output signal of the CDS circuit 3. The delay circuit 4 defers the output signal of the CDS circuit 3 by a time corresponding to one horizontal line, that is, a time corresponding to a horizontal scanning period. A time corresponding to one horizontal scanning period is referred to as a 1H time interval. The delay circuit 4 includes, for example, a line memory of the FIFO type. The adder 5 receives the output signal of the CDS circuit 3. Also, the adder 5 receives the output signal of the delay circuit 4. The device 5 adds the output signal of the CDS circuit 3 and the output signal of the delay circuit 4. In every 1-pixel-corresponding time interval, the output signal of the CDS circuit 3 and the output signal of the delay circuit 4 correspond to pixels which neighbor each other in the vertical direction and which exist in two adjacent lines respectively.

The delay circuit 6 receives the output signal of the adder 5. The delay circuit 6 defers the output signal of the adder 5 by a time corresponding to one pixel. The subtracter 7 receives the output signal of the adder 5. Also, the subtracter 7 receives the output signal of the delay circuit 6. The device 7 subtracts the output signal of the delay circuit 6 from the output signal of the adder 5, thereby generating a color signal "α". The subtracter 7 outputs the color signal "α". The sign change circuit 12 receives the output signal "α" of the subtracter 7. The sign change circuit 12 inverts the sign of the output signal "α" of the subtracter 7.

The first fixed contact 14a of the switch 14 receives the output signal of the sign change circuit 12. The second fixed contact 14b of the switch 14 receives the output signal "α" of the subtracter 7. As previously indicated, the timing signal generator 16 receives the pixel sync signal and the horizontal sync signal. The timing signal generator 16 includes, for example, a bistable multivibrator responsive to the pixel sync signal. The timing signal generator 16 converts the pixel sync signal into a first rectangular pulse signal in response to the horizontal sync signal. The first rectangular pulse signal periodically alternates between a low-level state and a high-level state. Specifically, the first rectangular pulse signal assumes the low-level state during a 1-pixel-corresponding time interval, and assumes the high-level state during a next 1-pixel-corresponding time interval. The timing signal generator 16 outputs the first rectangular pulse signal to the control terminal of the switch 14. The movable contact 14c of the switch 14 periodically and alternately connects with one of the first and second fixed contacts 14a and 14b thereof in response to the first rectangular pulse signal. Specifically, the movable contact 14c of the switch 14 connects with the first fixed contact 14a thereof during a 1-pixel-corresponding time interval, and connects with the second fixed contact 14b thereof during a next 1-pixel-corresponding time interval. Thus, the switch 14 periodically and alternately selects one of the output signal of the sign change circuit 12 and the output signal "α" of the subtracter 7. In more detail, the switch 14 selects the output signal of the sign change circuit 12 during a 1-pixel-corresponding time interval, and selects the output signal "α" of the subtracter 7 during a next 1-pixel-corresponding time interval.

The delay circuit 8 receives the output signal of the delay circuit 4. The delay circuit 8 defers the output signal of the delay circuit 4 by a time corresponding to one pixel. The adder 9 receives the output signal of the CDS circuit 3. Also, the adder 9 receives the output signal of the delay circuit 8. The device 9 adds the output signal of the CDS circuit 3 and the output signal of the delay circuit 8. In every 1-pixel-corresponding time interval, the output signal of the CDS circuit 3 and the output signal of the delay circuit 8 correspond to pixels which neighbor each other in an oblique direction and which exist in two adjacent lines respectively.

The delay circuit 10 receives the output signal of the adder 9. The delay circuit 10 defers the output signal of the adder 9 by a time corresponding to one pixel. The subtracter 11 receives the output signal of the adder 9. Also, the subtracter 11 receives the output signal of the delay circuit 10. The device 11 subtracts the output signal of the delay circuit 10 from the output signal of the adder 9, thereby generating a color signal "β". The subtracter 11 outputs the color signal "β". The sign change circuit 13 receives the output signal "β" of the subtracter 11. The sign change circuit 13 inverts the sign of the output signal "β" of the subtracter 11.

The first fixed contact 15a of the switch 15 receives the output signal of the sign change circuit 13. The second fixed contact 15b of the switch 15 receives the output signal "β" of the subtracter 11. The timing signal generator 16 converts the pixel sync signal into a second rectangular pulse signal in response to the horizontal sync signal. The second rectangular pulse signal periodically alternates between a low-level state and a high-level state. Specifically, the second rectangular pulse signal assumes the low-level state during a 1-pixel-corresponding time interval, and assumes the high-level state during a next 1-pixel-corresponding time interval. The timing signal generator 16 outputs the second rectangular pulse signal to the control terminal of the switch 15. The movable contact 15c of the switch 15 periodically and alternately connects with one of the first and second fixed contacts 15a and 15b thereof in response to the second rectangular pulse signal. Specifically, the movable contact 15c of the switch 15 connects with the first fixed contact 15a thereof during a 1-pixel-corresponding time interval, and connects with the second fixed contact 15b thereof during a next 1-pixel-corresponding time interval. Thus, the switch 15 periodically and alternately selects one of the output signal of the sign change circuit 13 and the output signal "β" of the subtracter 11. In more detail, the switch 15 selects the output signal of the sign change circuit 13 during a 1-pixel-corresponding time interval, and selects the output signal "β" of the subtracter 11 during a next 1-pixel-corresponding time interval.

Figure 3:
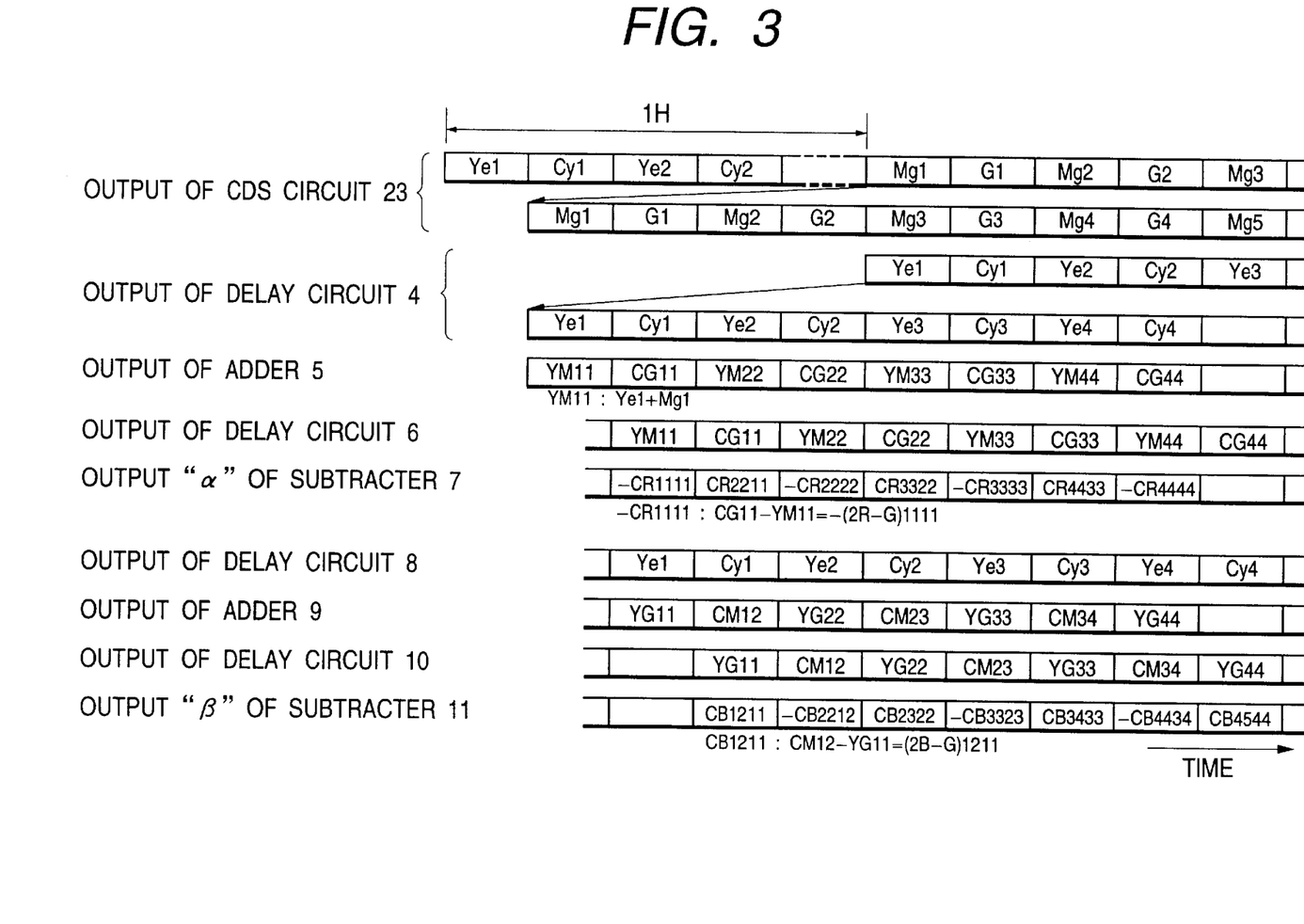
FIG. 3 is a time-domain diagram of various signals in the color camera apparatus of FIG. 1.

As shown in FIG. 3, during a first horizontal scanning period (1H), the output signal of the CDS circuit 3 has a sequence of a yellow-related time segment Ye1, a cyan-related time segment Cy1, a yellow-related time segment Ye2, a cyan-related time segment Cy2, .... During a second horizontal scanning period (1H), the output signal of the CDS circuit 3 has a sequence of a magenta-related time segment Mg1, a green-related time segment G1, a magenta-related time segment Mg2, a green-related time segment G2, a magenta-related time segment Mg3, As shown in FIG. 3, the output signal of the delay circuit 4 defers from the output signal of the CDS circuit 3 by a 1H time interval. As previously indicated, the adder 5 combines the output signal of the CDS circuit 3 and the output signal of the delay circuit 4. During the second horizontal scanning period, the output signal of the adder 5 has a sequence of time segments YM11, CG11, YM22, CG22, YM33, . . . The time segment YM11 of the output signal of the adder 5 is equal to the result of addition between the yellow-related time segment Ye1 and the magenta-related time segment Mg1 of the output signal of the CDS circuit 3. Thus, YM11=Ye1+Mg1. The time segment CG11 of the output signal of the adder 5 is equal to the result of addition between the cyan-related time segment Cy1 and the green-related time segment G1 of the output signal of the CDS circuit 3. Thus, CG11=Cy1+G1. The time segment YM22 of the output signal of the adder 5 is equal to the result of addition between the yellow-related time segment Ye2 and the magenta-related time segment Mg2 of the output signal of the CDS circuit 3. Thus, YM22=Ye2+Mg2. The time segment CG22 of the output signal of the adder 5 is equal to the result of addition between the cyan-related time segment Cy2 and the green-related time segment G2 of the output signal of the CDS circuit 3. Thus, CG22=Cy2+G2.

As shown in FIG. 3, the output signal of the delay circuit 6 defers from the output signal of the adder 5 by a time corresponding to one pixel. As previously indicated, the device 7 subtracts the output signal of the delay circuit 6 from the output signal of the adder 5. During the second horizontal scanning period, the output signal "α" of the subtracter 7 has a sequence of time segments −CR1111, CR2211, −CR2222, CR3322, −CR3333, CR4433, −CR4444, . The time segment −CR1111 of the output signal "α" of the subtracter 7 is equal to the result of the subtraction of the time segment YM11 from the time segment CG11 of the output signal of the adder 5. Thus, the following relation is available.

$$-CR1111 = CG11 - YM11$$
$$= Cy1 + G1 - (Ye1 + Mg1)$$
$$= B + G + G - (R + G + B + R)$$
$$= -(2R - G)$$

where "R", "G", and "B" denote a red-related signal component, a green-related signal component, and a blue-related signal component respectively. The time segment −CR1111 of the output signal "α" of the subtracter 7 is expressed as −(2R−G)1111. The time segment CR2211 of the output signal "α" of the subtracter 7 is equal to the result of the subtraction of the time segment CG11 from the time segment YM22 of the output signal of the adder 5. Thus, the following relation is available.

$$CR2211 = YM22 - CG11$$
$$= Ye2 + Mg2 - (Cy1 + G1)$$
$$= R + G + B + R - (B + G + G)$$
$$= 2R - G$$

The time segment CR2211 of the output signal "α" of the subtracter 7 is expressed as (2R−G)2211.

As shown in FIG. 3, the output signal of the delay circuit 8 defers from the output signal of the CDS circuit 3 by a 1H time interval plus a time corresponding to one pixel. As previously indicated, the adder 9 combines the output signal of the CDS circuit 3 and the output signal of the delay circuit 8. During the second horizontal scanning period, the output signal of the adder 9 has a sequence of time segments YG11, CM12, YG22, CM23, YG33, The time segment YG11 of the output signal of the adder 9 is equal to the result of addition between the yellow-related time segment Ye1 and the green-related time segment G1 of the output signal of the CDS circuit 3. Thus, YG11=Ye1+G1. The time segment CM12 of the output signal of the adder 9 is equal to the result of addition between the cyan-related time segment Cy1 and the magenta-related time segment Mg2 of the output signal of the CDS circuit 3. Thus, CM12=Cy1+Mg2. The time segment YG22 of the output signal of the adder 9 is equal to the result of addition between the yellow-related time segment Ye2 and the green-related time segment G2 of the output signal of the CDS circuit 3. Thus, YG22=Ye2+G2. The time segment CM23 of the output signal of the adder 9 is equal to the result of addition between the cyan-related time segment Cy2 and the magenta-related time segment Mg3 of the output signal of the CDS circuit 3. Thus, CM23=Cy2+Mg3.

As shown in FIG. 3, the output signal of the delay circuit 10 defers from the output signal of the adder 9 by a time corresponding to one pixel. As previously indicated, the device 11 subtracts the output signal of the delay circuit 10 from the output signal of the adder 9. During the second horizontal scanning period, the output signal "β" of the subtracter 11 has a sequence of time segments CB1211, −CB2212, CB2322, −CB3323, CB3433, −CB4434, CB4544, . . . . The time segment CB1211 of the output signal "β" of the subtracter 11 is equal to the result of the subtraction of the time segment YG11 from the time segment CM12 of the output signal of the adder 9. Thus, the following relation is available.

$$CB1211 = CM12 - YG11$$
$$= Cy1 + Mg2 - (Ye1 + G1)$$
$$= B + G + B + R - (R + G + G)$$
$$= 2B - G$$

The time segment CB1211 of the output signal "β" of the subtracter 11 is expressed as (2B−G)1211. The time segment −CB2212 of the output signal "β" of the subtracter 11 is equal to the result of the subtraction of the time segment CM12 from the time segment YG22 of the output signal of the adder 9. Thus, the following relation is available.

$$-CB2212 = YG22 - CM12$$
$$= Ye2 + G2 - (Cy1 + Mg2)$$
$$= R + G + G - (B + G + B + R)$$
$$= -(2B - G)$$

The time segment −CB2212 of the output signal "β" of the subtracter 11 is expressed as −(2B−G)2212.

Figure 4:
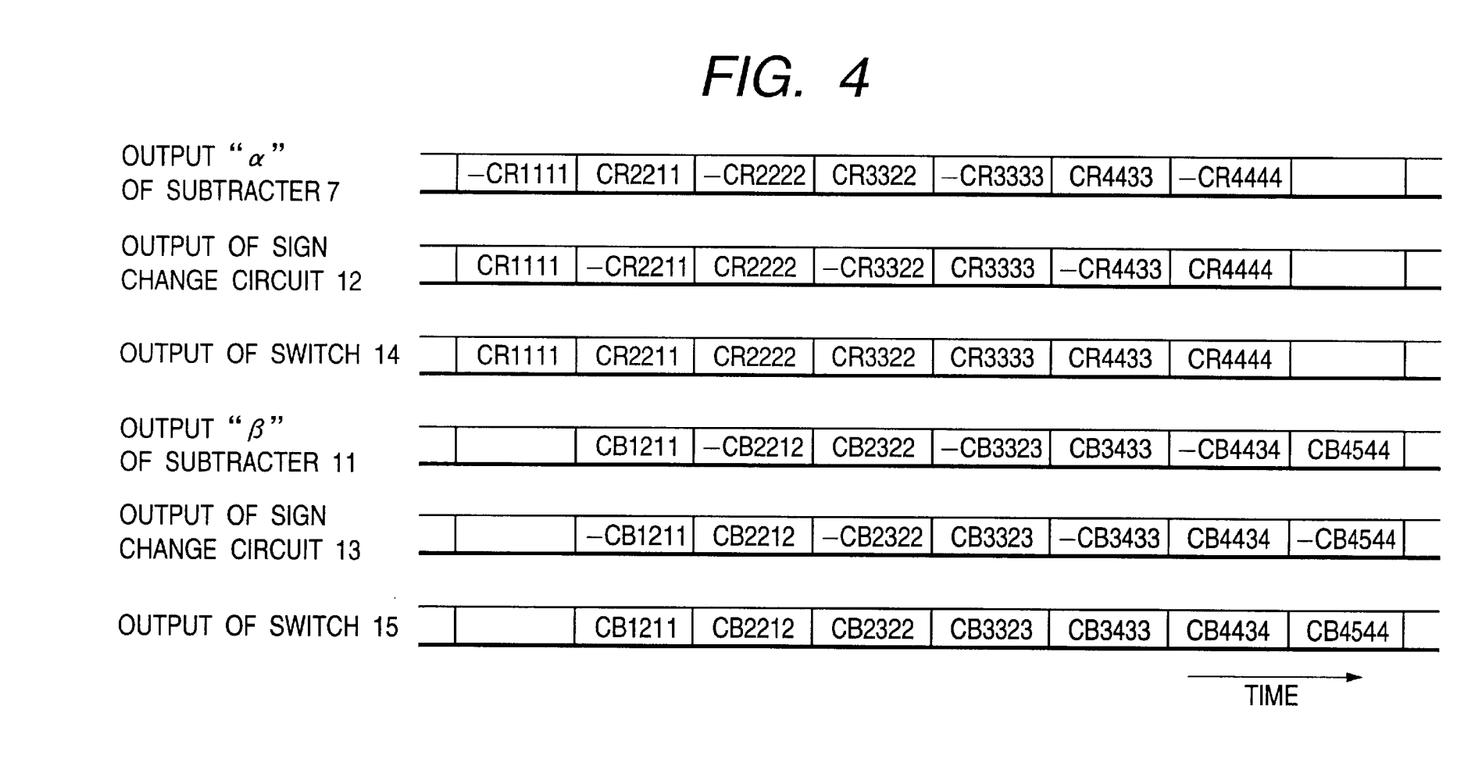
FIG. 4 is a time-domain diagram of various signals in the color camera apparatus of FIG. 1.

As shown in FIG. 4, the output signal of the sign change circuit 12 agrees with the sign-inversion of the output signal "α" of the subtracter 7. Thus, the output signal of the sign change circuit 12 has a sequence of time segments CR1111, −CR2211, CR2222, −CR3322, CR3333, −CR4433, CR4444, . . . . The switch 14 periodically and alternately selects one of the output signal "α" of the subtracter 7 and the output signal of the sign change circuit 12. Specifically, the switch 14 selects time segments CR1111, CR2222, CR3333, CR4444, . . . of the output signal of the sign change circuit 12 during first alternate 1-pixel-corresponding time intervals. The switch 14 selects time segments CR2211, CR3322, CR4433, . . . of the output signal "α" of the subtracter 7 during second alternate 1-pixel-corresponding time intervals. Thus, the output signal of the switch 14 has a sequence of time segments CR1111, CR2211, CR2222, CR3322, CR3333, CR4433, . . . Accordingly, the output signal of the switch 14 agrees with a color difference signal "2R−G" during a first horizontal scanning period with respect to the output signal of the switch 14.

As shown in FIG. 4, the output signal of the sign change circuit 13 agrees with the sign-inversion of the output signal "β" of the subtracter 11. Thus, the output signal of the sign change circuit 13 has a sequence of time segments −CB1211, CB2212, −CB2322, CB3323, −CB3433, CB4434, −CB4544, . . . . The switch 15 periodically and alternately selects one of the output signal "β" of the subtracter 11 and the output signal of the sign change circuit 13. Specifically, the switch 14 selects time segments CB1211, CB2322, CB3433, CB4544, . . . of the output signal "β" of the subtracter 11 during first alternate 1-pixel-corresponding time intervals. The switch 15 selects time segments CB2212, CB3323, CB4434, . . . of the output signal of the sign change circuit 13 during second alternate 1-pixel-corresponding time intervals. Thus, the output signal of the switch 15 has a sequence of time segments CB1211, CB2212, CB2322, CB3323, CB3433, CB4434, . . . . Accordingly, the output signal of the switch 15 agrees with a color difference signal "2B−G" during a first horizontal scanning period with respect to the output signal of the switch 15.

Figure 5:
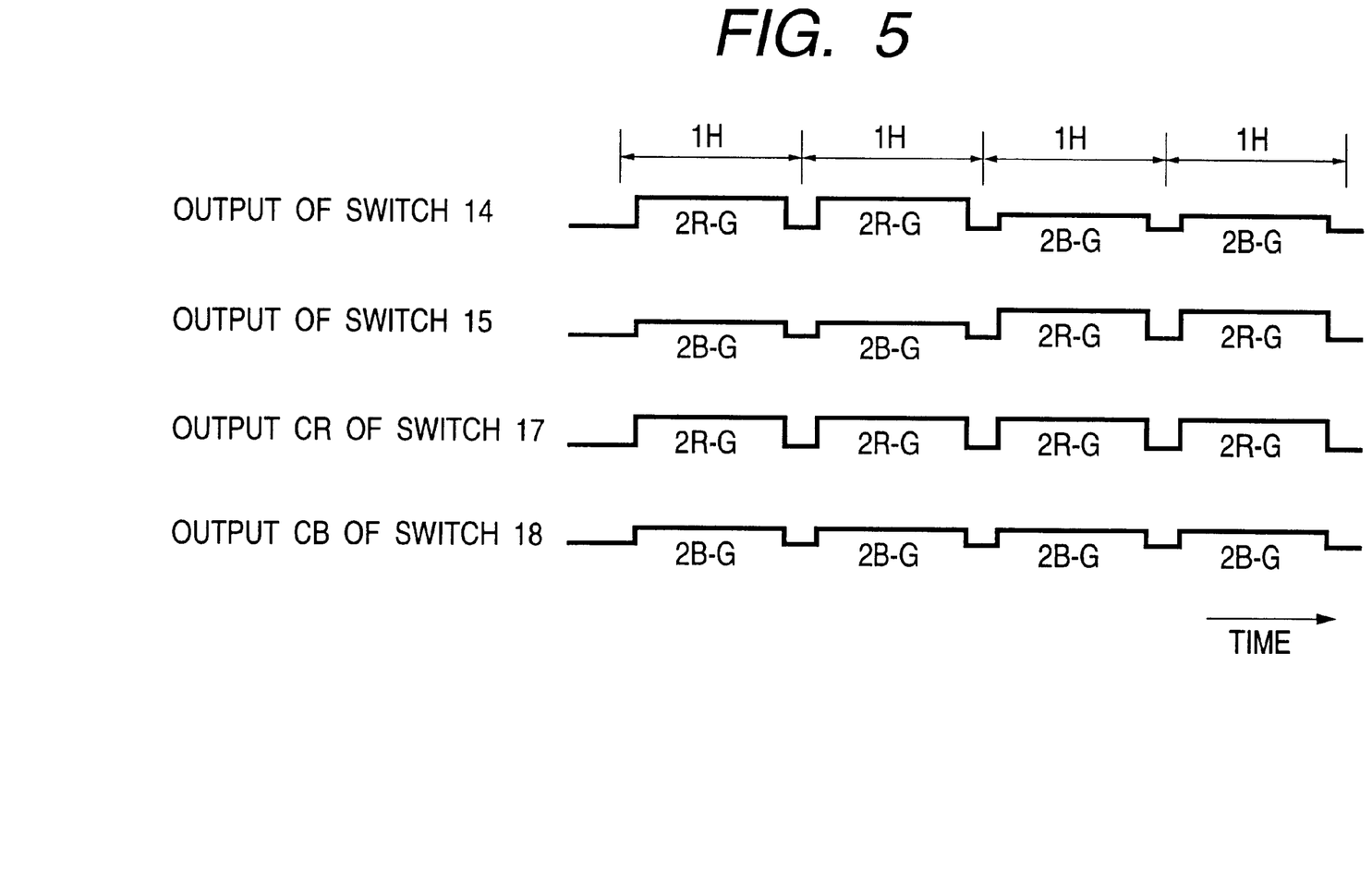
FIG. 5 is a time-domain diagram of various signals in the color camera apparatus of FIG. 1.

The timing signal generator 16 responds to the horizontal sync signal. The response of the timing signal generator 16 to the horizontal sync signal is designed to enable the following processes. As shown in FIG. 5, during a first horizontal scanning period, the output signal of the switch 14 agrees with a color difference signal "2R−G" while the output signal of the switch 15 agrees with a color difference signal "2B−G". During a second horizontal scanning period, the output signal of the switch 14 agrees with a color difference signal "2R−G" while the output signal of the switch 15 agrees with a color difference signal "2B−G". During a third horizontal scanning period, the output signal of the switch 14 agrees with a color difference signal "2B−G" while the output signal of the switch 15 agrees with a color difference signal "2R−G". During a fourth horizontal scanning period, the output signal of the switch 14 agrees with a color difference signal "2B−G" while the output signal of the switch 15 agrees with a color difference signal "2R−G". During fifth and later horizontal scanning periods, the output signal of the switch 14 and the output signal of the switch 15 periodically change as in the first, second, third, and fourth horizontal scanning periods.

As previously indicated, the timing signal generator 19 receives the horizontal sync signal. The timing signal generator 19 converts the horizontal sync signal into a rectangular pulse signal having a period equal to four times a horizontal scanning period (that is, a 4H time interval). The rectangular pulse signal periodically alternates between a low-level state and a high-level state. Specifically, the rectangular pulse signal assumes the low-level state during two successive horizontal scanning periods, and assumes the high-level state during next two successive horizontal scanning periods. The timing signal generator 19 outputs the rectangular pulse signal to the control terminal of the switch 17. The movable contact 17c of the switch 17 periodically and alternately connects with one of the first and second fixed contacts 17a and 17b thereof in response to the output signal of the timing signal generator 19. Specifically, the movable contact 17c of the switch 17 connects with the first fixed contact 17a thereof during two successive horizontal scanning periods, and connects with the second fixed contact 17b thereof during next two successive horizontal scanning periods. Thus, the switch 17 periodically and alternately selects one of the output signal of the switch 14 and the output signal of the switch 15. In more detail, the switch 17 selects the output signal of the switch 14 during the first and second horizontal scanning periods, and selects the output signal of the switch 15 during the third and fourth horizontal scanning periods. The switch 17 periodically implements similar signal selection during the fifth and later horizontal scanning periods. Accordingly, at the movable contact 17c of the switch 17, there occurs a color signal CR which continues to be equal to a color difference signal "2R−G" (see FIG. 5).

Also, the timing signal generator 19 outputs the rectangular pulse signal to the control terminal of the switch 18.

The movable contact 18c of the switch 18 periodically and alternately connects with one of the first and second fixed contacts 18a and 18b thereof in response to the rectangular pulse signal. Specifically, the movable contact 18c of the switch 18 connects with the first fixed contact 18a thereof during two successive horizontal scanning periods, and connects with the second fixed contact 18b thereof during next two successive horizontal scanning periods. Thus, the switch 18 periodically and alternately selects one of the output signal of the switch 14 and the output signal of the switch 15. In more detail, the switch 18 selects the output signal of the switch 15 during the first and second horizontal scanning periods, and selects the output signal of the switch 14 during the third and fourth horizontal scanning periods. The switch 18 periodically implements similar signal selection during the fifth and later horizontal scanning periods. Accordingly, at the movable contact 18c of the switch 18, there occurs a color signal CB which continues to be equal to a color difference signal "2B–G" (see FIG. 5). As shown in FIG. 5, the color signal CR (the color difference signal "2R–G") outputted from the switch 17 and the color signal CB (the color difference signal "2B–G") outputted from the switch 18 are synchronized with each other.

It should be noted that a delay circuit for providing a signal delay corresponding to a 1-pixel-corresponding time interval may be provided among the switches 14, 17, and 18. In this case, the input terminal of the delay circuit is connected to the movable contact 14c of the switch 14 while the output terminal of the delay circuit is connected to the first fixed contact 17a of the switch 17 and the second fixed contact 18b of the switch 18.

Second Embodiment

Figure 6:
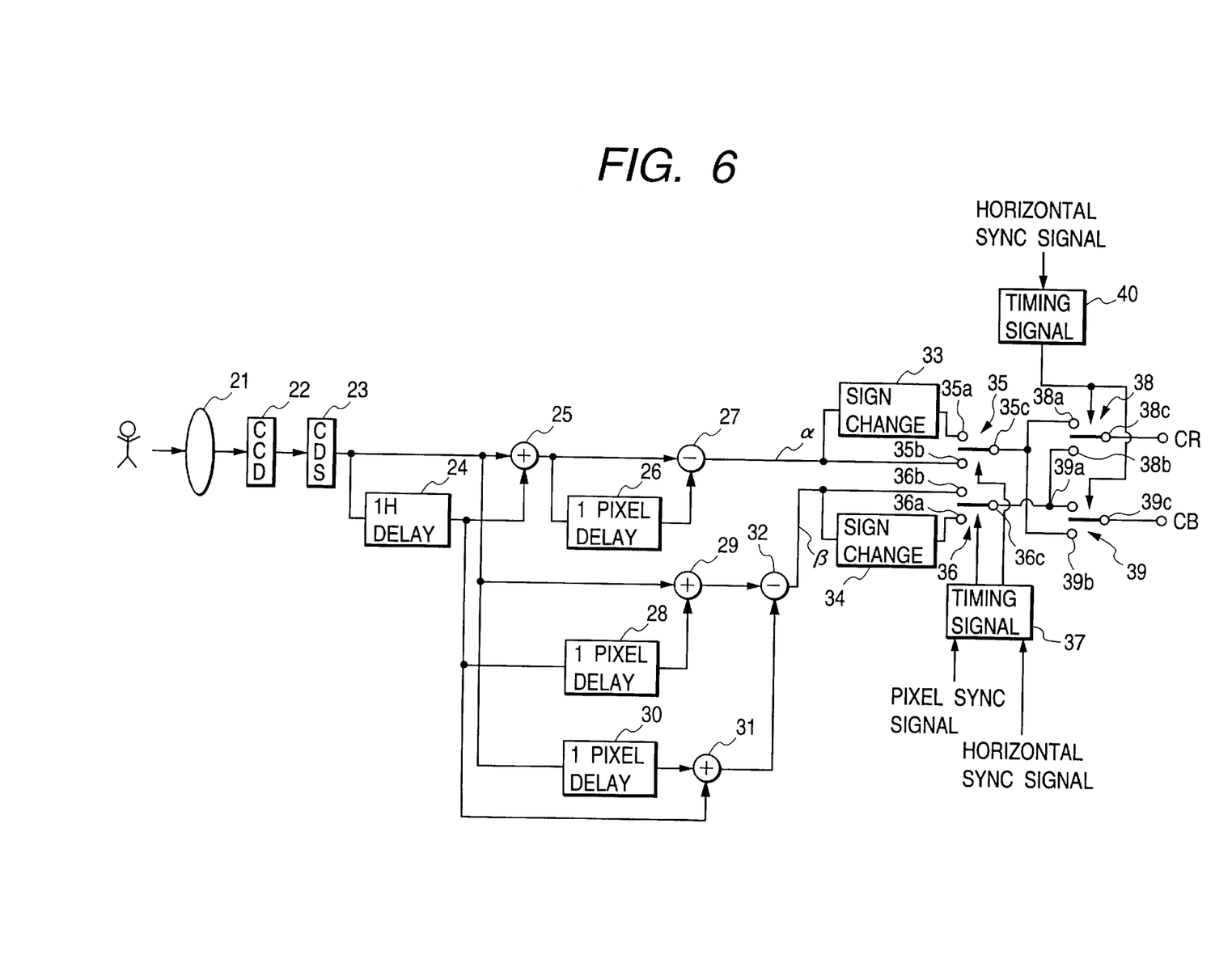
FIG. 6 is a block diagram of a color camera apparatus according to a second embodiment of this invention.

FIG. 6 shows a color camera apparatus (a color image pickup apparatus) according to a second embodiment of this invention. The camera apparatus of FIG. 6 has an optical section 21, a photo-to-electric conversion section (a CCD-based image pickup section) 22, and a signal processing section.

The optical section 21 focuses light from the scene onto the surface of a photosensitive diode array in the photo-to-electric conversion section 22. Thus, an image of the scene is developed at the surface of the photosensitive diode array.

The photo-to-electric conversion section 22 includes a two-dimensional array of photosensitive diodes, and a checkered color separation filter extending in front of the photosensitive diode array, and a CCD (charge-coupled device) array connected to the photosensitive diode array. The light from the scene passes through the color separation filter before forming the image of the scene at the surface of the photosensitive diode array. The photosensitive diodes convert the corresponding segments of the image into electric signals. The photosensitive diode array is subjected to known progressive scanning. Thus, the photosensitive diode array is progressively scanned line-by-line. The electric signals generated by the photosensitive diodes are sequentially transmitted therefrom by the CCD array, and are multiplexed and combined into a first color picture signal. The photo-to-electric conversion section 22 outputs the first color picture signal to the signal processing section. The color separation filter in the photo-electric conversion section 22 has a checkered structure shown in FIG. 2.

With reference to FIG. 6, the signal processing section includes a CDS (correlation double sampling, or correlation dual sampling) circuit 23 which follows the photo-to-electric conversion section 22. The CDS circuit 23 receives the output signal of the photo-to-electric conversion section 22. The CDS circuit 23 subjects the output signal of the photo-to-electric conversion section 22 to a known correlation double sampling process or a known correlation dual sampling process, thereby reducing random noise therein. Accordingly, the CDS circuit 23 generates a noise-reduced picture signal from the output signal of the photo-to-electric conversion section 22. The noise-reduced picture signal is referred to as the second picture signal. The CDS circuit 23 outputs the second picture signal to a later stage.

The signal processing section also includes a delay circuit 24, an adder 25, a delay circuit 26, a subtracter 27, a delay circuit 28, an adder 29, a delay circuit 30, an adder 31, a subtracter 32, sign change circuits 33 and 34, switches 35 and 36, and a timing signal generator 37. The input terminal of the delay circuit 24 is connected to the output terminal of the CDS circuit 23. A first input terminal of the adder 25 is connected to the output terminal of the CDS circuit 23. A second input terminal of the adder 25 is connected to the output terminal of the delay circuit 24. The input terminal of the delay circuit 26 is connected to the output terminal of the adder 25. A first input terminal of the subtracter 27 is connected to the output terminal of the adder 25. A second input terminal of the subtracter 27 is connected to the output terminal of the delay circuit 26. The input terminal of the sign change circuit 33 is connected to the output terminal of the subtracter 27.

The switch 35 has first and second fixed contacts 35a and 35b, a movable contact 35c, and a control terminal. The movable contact 35c selectively connects with one of the first and second fixed contacts 35a and 35b in response to a signal applied to the control terminal. The first fixed contact 35a is connected to the output terminal of the sign change circuit 33. The second fixed contact 35b is connected to the output terminal of the subtracter 27. The timing signal generator 37 receives a pixel sync signal which has pulses synchronized with 1-pixel-corresponding time intervals respectively. Also, the timing signal generator 37 receives a horizontal sync signal. A first output terminal of the timing signal generator 37 is connected to the control terminal of the switch 35.

The input terminal of the delay circuit 28 is connected to the output terminal of the delay circuit 24. A first input terminal of the adder 29 is connected to the output terminal of the CDS circuit 23. A second input terminal of the adder 29 is connected to the output terminal of the delay circuit 28. The input terminal of the delay circuit 30 is connected to the output terminal of the CDS circuit 23. A first input terminal of the adder 31 is connected to the output terminal of the delay circuit 30. A second input terminal of the adder 31 is connected to the output terminal of the delay circuit 24. A first input terminal of the subtracter 32 is connected to the output terminal of the adder 29. A second input terminal of the subtracter 32 is connected to the output terminal of the adder 31. The input terminal of the sign change circuit 34 is connected to the output terminal of the subtracter 32.

The switch 36 has first and second fixed contacts 36a and 36b, a movable contact 36c, and a control terminal. The movable contact 36c selectively connects with one of the first and second fixed contacts 36a and 36b in response to a signal applied to the control terminal. The first fixed contact 36a is connected to the output terminal of the sign change circuit 34. The second fixed contact 36b is connected to the output terminal of the subtracter 32. The control terminal of the switch 36 is connected to a second output terminal of the timing signal generator 37.

With reference to FIG. 6, the signal processing section further includes switches 38 and 39, and a timing signal generator 40. The timing signal generator 40 receives the horizontal sync signal. The timing signal generator 40 includes, for example, a cascade combination of two bistable multivibrators which responds to the horizontal sync signal.

The switch 38 has first and second fixed contacts 38a and 38b, a movable contact 38c, and a control terminal. The movable contact 38c selectively connects with one of the first and second fixed contacts 38a and 38b in response to a signal applied to the control terminal. The first fixed contact 38a is connected to the movable contact 35c of the switch 35. The second fixed contact 38b is connected to the movable contact 36c of the switch 36. The control terminal of the switch 38 is connected to the output terminal of the timing signal generator 40.

The switch 39 has first and second fixed contacts 39a and 39b, a movable contact 39c, and a control terminal. The movable contact 39c selectively connects with one of the first and second fixed contacts 39a and 39b in response to a signal applied to the control terminal. The first fixed contact 39a is connected to the movable contact 36c of the switch 36. The second fixed contact 39b is connected to the movable contact 35c of the switch 35. The control terminal of the switch 39 is connected to the output terminal of the timing signal generator 40.

The signal processing section operates as follows. The delay circuit 24 receives the output signal of the CDS circuit 23. The delay circuit 24 defers the output signal of the CDS circuit 23 by a time corresponding to one horizontal line, that is, a time corresponding to a horizontal scanning period. A time corresponding to a horizontal scanning period is referred to as a 1H time interval. The delay circuit 24 includes, for example, a line memory of the FIFO type. The adder 25 receives the output signal of the CDS circuit 23. Also, the adder 25 receives the output signal of the delay circuit 24. The device 25 adds the output signal of the CDS circuit 23 and the output signal of the delay circuit 24. In every 1-pixel-corresponding time interval, the output signal of the CDS circuit 23 and the output signal of the delay circuit 24 correspond to pixels which neighbor each other in the vertical direction and which exist in two adjacent lines respectively.

The delay circuit 26 receives the output signal of the adder 25. The delay circuit 26 defers the output signal of the adder 25 by a time corresponding to one pixel. The subtracter 27 receives the output signal of the adder 25. Also, the subtracter 27 receives the output signal of the delay circuit 26. The device 27 subtracts the output signal of the delay circuit 26 from the output signal of the adder 25, thereby generating a color signal "α". The subtracter 27 outputs the color signal "α". The sign change circuit 33 receives the output signal "α" of the subtracter 27. The sign change circuit 33 inverts the sign of the output signal "α" of the subtracter 27.

The first fixed contact 35a of the switch 35 receives the output signal of the sign change circuit 33. The second fixed contact 35b of the switch 35 receives the output signal "α" of the subtracter 27. As previously indicated, the timing signal generator 37 receives the pixel sync signal and the horizontal sync signal. The timing signal generator 37 includes, for example, a bistable multivibrator responsive to the pixel sync signal. The timing signal generator 37 converts the pixel sync signal into a first rectangular pulse signal in response to the horizontal sync signal. The first rectangular pulse signal periodically alternates between a low-level state and a high-level state. Specifically, the first rectangular pulse signal assumes the low-level state during a 1-pixel-corresponding time interval, and assumes the high-level state during a next 1-pixel-corresponding time interval. The timing signal generator 37 outputs the first rectangular pulse signal to the control terminal of the switch 35. The movable contact 35c of the switch 35 periodically and alternately connects with one of the first and second fixed contacts 35a and 35b thereof in response to the first rectangular pulse signal. Specifically, the movable contact 35c of the switch 35 connects with the first fixed contact 35a thereof during a 1-pixel-corresponding time interval, and connects with the second fixed contact 35b thereof during a next 1-pixel-corresponding time interval. Thus, the switch 35 periodically and alternately selects one of the output signal of the sign change circuit 33 and the output signal "α" of the subtracter 27. In more detail, the switch 35 selects the output signal of the sign change circuit 33 during a 1-pixel-corresponding time interval, and selects the output signal "α" of the subtracter 27 during a next 1-pixel-corresponding time interval.

The delay circuit 28 receives the output signal of the delay circuit 24. The delay circuit 28 defers the output signal of the delay circuit 24 by a time corresponding to one pixel. The adder 29 receives the output signal of the CDS circuit 23. Also, the adder 29 receives the output signal of the delay circuit 28. The device 29 adds the output signal of the CDS circuit 23 and the output signal of the delay circuit 28. In every 1-pixel-corresponding time interval, the output signal of the CDS circuit 23 and the output signal of the delay circuit 28 correspond to pixels which neighbor each other in an oblique direction and which exist in two adjacent lines respectively.

The delay circuit 30 receives the output signal of the CDS circuit 23. The delay circuit 30 defers the output signal of the CDS circuit 23 by a time corresponding to one pixel. The adder 31 receives the output signal of the delay circuit 24. Also, the adder 31 receives the output signal of the delay circuit 30. The device 31 adds the output signal of the delay circuit 24 and the output signal of the delay circuit 30. In every 1-pixel-corresponding time interval, the output signal of the delay circuit 24 and the output signal of the delay circuit 30 correspond to pixels which neighbor each other in an oblique direction and which exist in two adjacent lines respectively.

The subtracter 32 receives the output signal of the adder 29. Also, the subtracter 32 receives the output signal of the adder 31. The device 32 subtracts the output signal of the adder 31 from the output signal of the adder 29, thereby generating a color signal "β". The subtracter 32 outputs the color signal "β". The sign change circuit 34 receives the output signal "β" of the subtracter 32. The sign change circuit 34 inverts the sign of the output signal "β" of the subtracter 32.

The first fixed contact 36a of the switch 36 receives the output signal of the sign change circuit 34. The second fixed contact 36b of the switch 36 receives the output signal "α" of the subtracter 32. The timing signal generator 37 converts the pixel sync signal into a second rectangular pulse signal in response to the horizontal sync signal. The second rectangular pulse signal periodically alternates between a low-level state and a high-level state. Specifically, the second rectangular pulse signal assumes the low-level state during a 1-pixel-corresponding time interval, and assumes the high-level state during a next 1-pixel-corresponding time interval. The timing signal generator 37 outputs the second rectangular pulse signal to the control terminal of the switch 36. The movable contact 36c of the switch 36 periodically and alternately connects with one of the first and second fixed contacts 36a and 36b thereof in response to the second rectangular pulse signal. Specifically, the movable contact 36c of the switch 36 connects with the first fixed contact 36a thereof during a 1-pixel-corresponding time interval, and connects with the second fixed contact 36b thereof during a next 1-pixel-corresponding time interval. Thus, the switch 36 periodically and alternately selects one of the output signal of the sign change circuit 34 and the output signal "β" of the subtracter 32. In more detail, the switch 36 selects the output signal of the sign change circuit 34 during a 1-pixel-corresponding time interval, and selects the output signal "β" of the subtracter 32 during a next 1-pixel-corresponding time interval.

Figure 7:
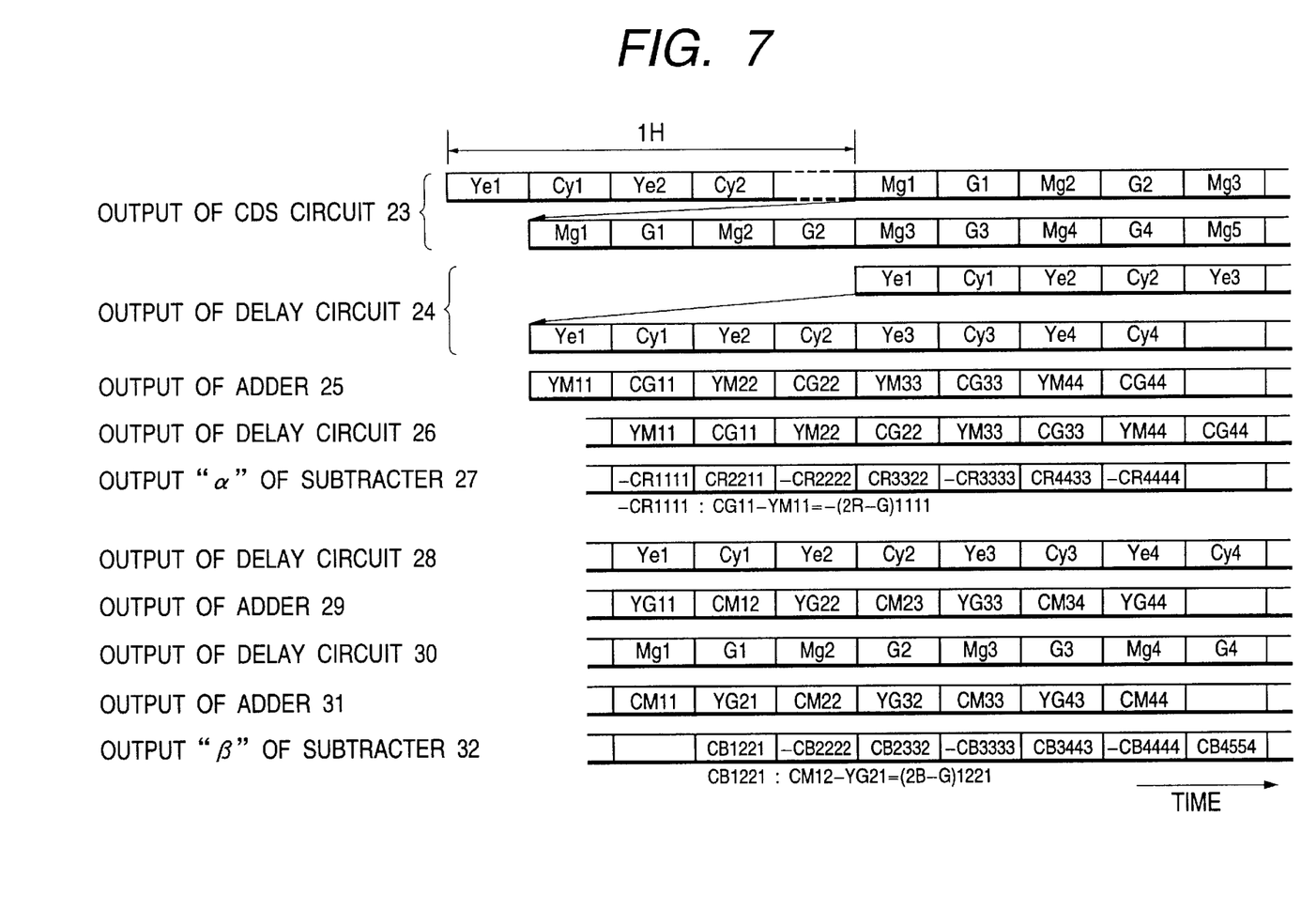
FIG. 7 is a time-domain diagram of various signals in the color camera apparatus of FIG. 6.

As shown in FIG. 7, during a first horizontal scanning period (1H), the output signal of the CDS circuit 23 has a sequence of a yellow-related time segment Ye1, a cyan-related time segment Cy1, a yellow-related time segment Ye2, a cyan-related time segment Cy2, . . . During a second horizontal scanning period (1H), the output signal of the CDS circuit 23 has a sequence of a magenta-related time segment Mg1, a green-related time segment G1, a magenta-related time segment Mg2, a green-related time segment G2, a magenta-related time segment Mg3, . . . .

As shown in FIG. 7, the output signal of the delay circuit 24 defers from the output signal of the CDS circuit 23 by a 1H time interval. As previously indicated, the adder 25 combines the output signal of the CDS circuit 23 and the output signal of the delay circuit 24. During the second horizontal scanning period, the output signal of the adder 25 has a sequence of time segments YM11, CG11, YM22, CG22, YM33, . . . . The time segment YM11 of the output signal of the adder 25 is equal to the result of addition between the yellow-related time segment Ye1 and the magenta-related time segment Mg1 of the output signal of the CDS circuit 23. Thus, YM11=Ye1+Mg1. The time segment CG11 of the output signal of the adder 25 is equal to the result of addition between the cyan-related time segment Cy1 and the green-related time segment G1 of the output signal of the CDS circuit 23. Thus, CG11=Cy1+G1. The time segment YM22 of the output signal of the adder 25 is equal to the result of addition between the yellow-related time segment Ye2 and the magenta-related time segment Mg2 of the output signal of the CDS circuit 23. Thus, YM22=Ye2+Mg2. The time segment CG22 of the output signal of the adder 25 is equal to the result of addition between the cyan-related time segment Cy2 and the green-related time segment G2 of the output signal of the CDS circuit 23. Thus, CG22=Cy2+G2.

As shown in FIG. 7, the output signal of the delay circuit 26 defers from the output signal of the adder 25 by a time corresponding to one pixel. As previously indicated, the device 27 subtracts the output signal of the delay circuit 26 from the output signal of the adder 25. During the second horizontal scanning period, the output signal "α" of the subtracter 27 has a sequence of time segments −CR1111, CR2211, −CR2222, CR3322, −CR3333, CR4433, −CR4444, . . . . The time segment −CR1111 of the output signal "α" of the subtracter 27 is equal to the result of the subtraction of the time segment YM11 from the time segment CG11 of the output signal of the adder 25. Thus, the following relation is available.

$$-CR1111 = CG11 - YM11$$

$$= Cy1 + G1 - (Ye1 + Mg1)$$

$$= B + G + G - (R + G + B + R)$$

$$= -(2R - G)$$

where "R", "G", and "B" denote a red-related signal component, a green-related signal component, and a blue-related signal component respectively. The time segment −CR1111 of the output signal "α" of the subtracter 27 is expressed as −(2R−G)1111. The time segment CR2211 of the output signal "α" of the subtracter 27 is equal to the result of the subtraction of the time segment CG11 from the time segment YM22 of the output signal of the adder 25. Thus, the following relation is available.

$$CR2211 = YM22 - CG11$$

$$= Ye2 + Mg2 - (Cy1 + G1)$$

$$= R + G + B + R - (B + G + G)$$

$$= 2R - G$$

The time segment CR2211 of the output signal "α" of the subtracter 27 is expressed as (2R−G)2211.

As shown in FIG. 7, the output signal of the delay circuit 28 defers from the output signal of the CDS circuit 23 by a 1H time interval plus a time corresponding to one pixel. As previously indicated, the adder 29 combines the output signal of the CDS circuit 23 and the output signal of the delay circuit 28. During the second horizontal scanning period, the output signal of the adder 29 has a sequence of time segments YG11, CM12, YG22, CM23, YG33, . . . . The time segment YG11 of the output signal of the adder 29 is equal to the result of addition between the yellow-related time segment Ye1 and the green-related time segment G1 of the output signal of the CDS circuit 23. Thus, YG11=Ye1+G1. The time segment CM12 of the output signal of the adder 29 is equal to the result of addition between the cyan-related time segment Cy1 and the magenta-related time segment Mg2 of the output signal of the CDS circuit 23. Thus, CM12=Cy1+Mg2. The time segment YG22 of the output signal of the adder 29 is equal to the result of addition between the yellow-related time segment Ye2 and the green-related time segment G2 of the output signal of the CDS circuit 23. Thus, YG22=Ye2+G2. The time segment CM23 of the output signal of the adder 29 is equal to the result of addition between the cyan-related time segment Cy2 and the magenta-related time segment Mg3 of the output signal of the CDS circuit 23. Thus, CM23=Cy2+Mg3.

As shown in FIG. 7, the output signal of the delay circuit 30 defers from the output signal of the CDS circuit 23 by a time corresponding to one pixel. As previously indicated, the adder 31 combines the output signal of the delay circuit 24 and the output signal of the delay circuit 30. During the second horizontal scanning period, the output signal of the adder 31 has a sequence of time segments CM11, YG21, CM22, YG32, CM33, . . . . The time segment CM11 of the output signal of the adder 31 is equal to the result of addition between the cyan-related time segment Cy1 and the magenta-related time segment Mg1 of the output signal of the CDS circuit 23. Thus, CM11=Cy1+Mg1. The time segment YG21 of the output signal of the adder 31 is equal to the result of addition between the yellow-related time segment Ye2 and the green-related time segment G1 of the output signal of the CDS circuit 23. Thus, YG21=Ye2+G1. The time segment CM22 of the output signal of the adder 31 is equal to the result of addition between the cyan-related time segment Cy2 and the magenta-related time segment Mg2 of the output signal of the CDS circuit 23. Thus, CM22=Cy2+Mg2. The time segment YG32 of the output signal of the adder 31 is equal to the result of addition between the yellow-related time segment Ye3 and the green-related time segment G2 of the output signal of the CDS circuit 23. Thus, YG32=Ye3+G2.

As previously indicated, the device 32 subtracts the output signal of the adder 31 from the output signal of the adder 29. During the second horizontal scanning period, the output signal "β" of the subtracter 32 has a sequence of time segments CB1221, −CB2222, CB2332, −CB3333, CB3443, −CB4444, CB4554, . . . . The time segment CB1221 of the output signal "β" of the subtracter 32 is equal to the result of the subtraction between the time segment YG21 of the output signal of the adder 31 and the time segment CM12 of the output signal of the adder 29. Thus, the following relation is available.

$$CB1221 = CM12 - YG21$$
$$= Cy1 + Mg2 - (Ye2 + G1)$$
$$= B + G + B + R - (R + G + G)$$
$$= 2B - G$$

The time segment CB1221 of the output signal "β" of the subtracter 32 is expressed as (2B−G)1221. The time segment −CB2222 of the output signal "β" of the subtracter 32 is equal to the result of the subtraction between the time segment CM22 of the output signal of the adder 31 and the time segment YG22 of the output signal of the adder 29. Thus, the following relation is available.

$$-CB2222 = YG22 - CM22$$
$$= Ye2 + G2 - (Cy2 + Mg2)$$
$$= R + G + G - (B + G + B + R)$$
$$= -(2B - G)$$

The time segment −CB2222 of the output signal "β" of the subtracter 32 is expressed as −(2B−G)2212.

Figure 8:
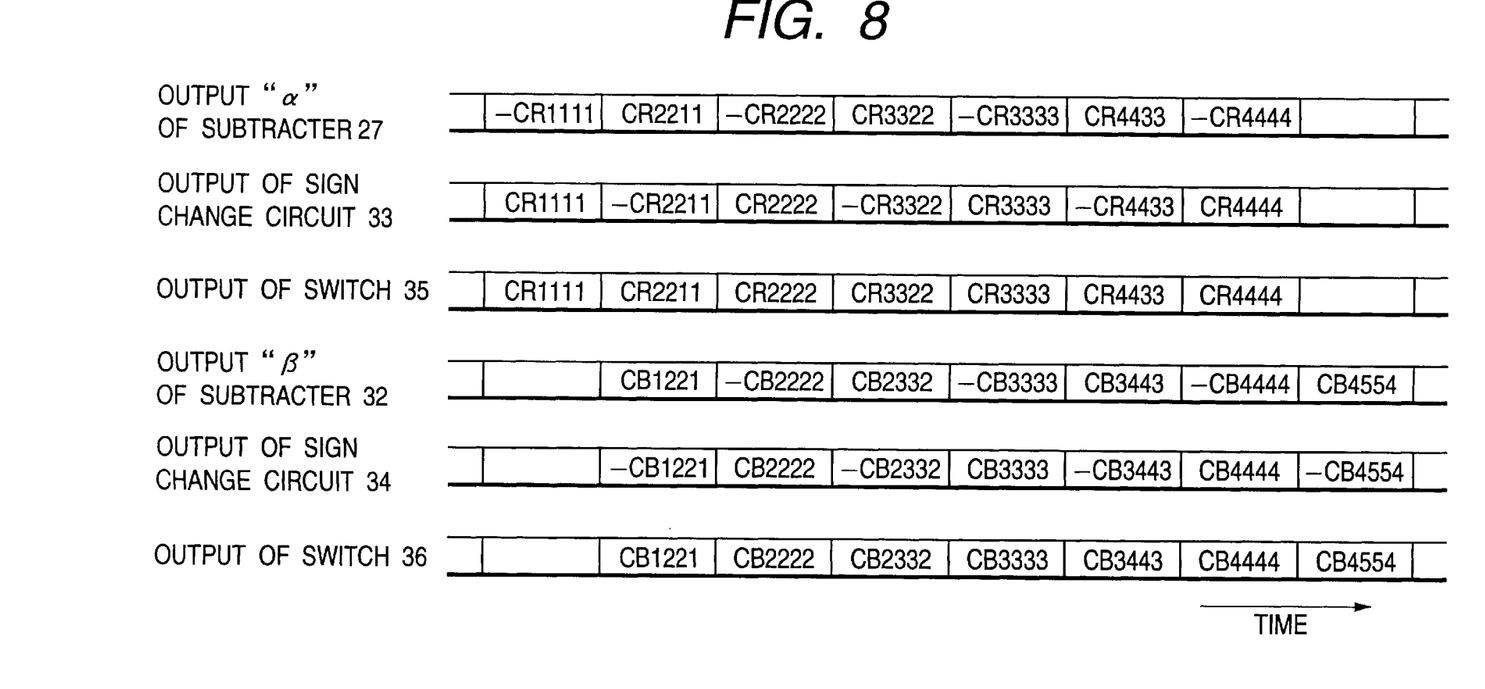
FIG. 8 is a time-domain diagram of various signals in the color camera apparatus of FIG. 6.

As shown in FIG. 8, the output signal of the sign change circuit 33 agrees with the sign-inversion of the output signal "α" of the subtracter 27. Thus, the output signal of the sign change circuit 33 has a sequence of time segments CR1111, −CR2211, CR2222, −CR3322, CR3333, −CR4433, CR4444, . . . . The switch 35 periodically and alternately selects one of the output signal "α" of the subtracter 27 and the output signal of the sign change circuit 33. Specifically, the switch 35 selects time segments CR1111, CR2222, CR3333, CR4444, . . . of the output signal of the sign change circuit 33 during first alternate 1-pixel-corresponding time intervals. The switch 35 selects time segments CR2211, CR3322, CR4433, . . . of the output signal "α" of the subtracter 27 during second alternate 1-pixel-corresponding time intervals. Thus, the output signal of the switch 35 has a sequence of time segments CR1111, CR2211, CR2222, CR3322, CR3333, CR4433, . . . . Accordingly, the output signal of the switch 35 agrees with a color difference signal "2R−G" during a first horizontal scanning period with respect to the output signal of the switch 35.

As shown in FIG. 8, the output signal of the sign change circuit 34 agrees with the sign-inversion of the output signal "β" of the subtracter 32. Thus, the output signal of the sign change circuit 34 has a sequence of time segments −CB1221, CB2222, −CB2332, CB3333, −CB3443, CB4444, −CB4554, . . . . The switch 36 periodically and alternately selects one of the output signal "β" of the subtracter 32 and the output signal of the sign change circuit 34. Specifically, the switch 36 selects time segments CB1221, CB2332, CB3443, CB4554, . . . of the output signal "β" of the subtracter 32 during first alternate 1-pixel-corresponding time intervals. The switch 36 selects time segments CB2222, CB3333, CB4444, . . . of the output signal of the sign change circuit 34 during second alternate 1-pixel-corresponding time intervals. Thus, the output signal of the switch 36 has a sequence of time segments CB1221, CB2222, CB2332, CB3333, CB3443, CB4444, . . . . Accordingly, the output signal of the switch 36 agrees with a color difference signal "2B−G" during a first horizontal scanning period with respect to the output signal of the switch 36.

The timing signal generator 37 responds to the horizontal sync signal. The response of the timing signal generator 37 to the horizontal sync signal is designed to enable the following processes. During a first horizontal scanning period, the output signal of the switch 35 agrees with a color difference signal "2R−G" while the output signal of the switch 36 agrees with a color difference signal "2B−G". During a second horizontal scanning period, the output signal of the switch 35 agrees with a color difference signal "2R−G" while the output signal of the switch 36 agrees with a color difference signal "2B−G". During a third horizontal scanning period, the output signal of the switch 35 agrees with a color difference signal "2B−G" while the output signal of the switch 36 agrees with a color difference signal "2R−G". During a fourth horizontal scanning period, the output signal of the switch 35 agrees with a color difference signal "2B−G" while the output signal of the switch 36 agrees with a color difference signal "2R−G". During fifth and later horizontal scanning periods, the output signal of the switch 35 and the output signal of the switch 36 periodically change as in the first, second, third, and fourth horizontal scanning periods.

As previously indicated, the timing signal generator 40 receives the horizontal sync signal. The timing signal generator 40 converts the horizontal sync signal into a rectangular pulse signal having a period equal to four times a horizontal scanning period (that is, a 4H time interval). The rectangular pulse signal periodically alternates between a low-level state and a high-level state. Specifically, the rectangular pulse signal assumes the low-level state during two successive horizontal scanning periods, and assumes the high-level state during next two successive horizontal scanning periods. The timing signal generator 40 outputs the rectangular pulse signal to the control terminal of the switch 38. The movable contact 38c of the switch 38 periodically and alternately connects with one of the first and second fixed contacts 38a and 38b thereof in response to the output signal of the timing signal generator 40. Specifically, the movable contact 38c of the switch 38 connects with the first fixed contact 38a thereof during two successive horizontal scanning periods, and connects with the second fixed contact 38b thereof during next two successive horizontal scanning periods. Thus, the switch 38 periodically and alternately selects one of the output signal of the switch 35 and the output signal of the switch 36. In more detail, the switch 38 selects the output signal of the switch 35 during the first and second horizontal scanning periods, and selects the output signal of the switch 36 during the third and fourth horizontal scanning periods. The switch 38 periodically implements similar signal selection during the fifth and later horizontal scanning periods. Accordingly, at the movable contact 38c of the switch 38, there occurs a color signal CR which continues to be equal to a color difference signal "2R−G".

Also, the timing signal generator 40 outputs the rectangular pulse signal to the control terminal of the switch 39. The movable contact 39c of the switch 39 periodically and alternately connects with one of the first and second fixed contacts 39a and 39b thereof in response to the rectangular pulse signal. Specifically, the movable contact 39c of the switch 39 connects with the first fixed contact 39a thereof during two successive horizontal scanning periods, and connects with the second fixed contact 39b thereof during next two successive horizontal scanning periods. Thus, the switch 39 periodically and alternately selects one of the output signal of the switch 35 and the output signal of the switch 36. In more detail, the switch 39 selects the output signal of the switch 36 during the first and second horizontal scanning periods, and selects the output signal of the switch 35 during the third and fourth horizontal scanning periods. The switch 39 periodically implements similar signal selection during the fifth and later horizontal scanning periods. Accordingly, at the movable contact 39c of the switch 39, there occurs a color signal CB which continues to be equal to a color difference signal "2B−G". The color signal CR (the color difference signal "2R−G") outputted from the switch 38 and the color signal CB (the color difference signal "2B−G") outputted from the switch 39 are synchronized with each other.

It should be noted that a delay circuit for providing a signal delay corresponding to a 1-pixel-corresponding time interval may be provided among the switches 35, 38, and 39. In this case, the input terminal of the delay circuit is connected to the movable contact 35c of the switch 35 while the output terminal of the delay circuit is connected to the first fixed contact 38a of the switch 38 and the second fixed contact 39b of the switch 39.

What is claimed is:

1. A color image pickup apparatus comprising:
    a photo-to-electric conversion section subjected to progressive scanning;
    a first delay circuit for delaying an output signal of the photo-to-electric conversion section;
    a first adder for adding the output signal of the photo-to-electric conversion section and an output signal of the first delay circuit;
    a second delay circuit for delaying the output signal of the first delay circuit;
    a second adder for adding the output signal of the photo-to-electric conversion section and an output signal of the second delay circuit;
    a third delay circuit for delaying an output signal of the first adder;
    a first subtracter for implementing subtraction between the output signal of the first adder and an output signal of the third delay circuit;
    a fourth delay circuit for delaying an output signal of the second adder;
    a second subtracter for implementing subtraction between the output signal of the second adder and an output signal of the fourth delay circuit;
    a first sign change circuit for inverting a sign of an output signal of the first subtracter;
    a first selector for periodically and alternately selecting one of the output signal of the first subtracter and an output signal of the first sign change circuit;
    a second sign change circuit for inverting a sign of an output signal of the second subtracter;
    a second selector for periodically and alternately selecting one of the output signal of the second subtracter and an output signal of the second sign change circuit; and
    means for generating two different color-difference signals in response to an output signal of the first selector and an output signal of the second selector.

2. A color image pickup apparatus comprising:
    a photo-to-electric conversion section subjected to progressive scanning;
    a first delay circuit for delaying an output signal of the photo-to-electric conversion section;
    a first adder for adding the output signal of the photo-to-electric conversion section and an output signal of the first delay circuit;
    a second delay circuit for delaying the output signal of the first delay circuit;
    a second adder for adding the output signal of the photo-to-electric conversion section and an output signal of the second delay circuit;
    a third delay circuit for delaying the output signal of the photo-to-electric conversion section;
    a third adder for adding the output signal of the first delay circuit and an output signal of the third delay circuit;
    a fourth delay circuit for delaying an output signal of the first adder;
    a first subtracter for implementing subtraction between the output signal of the first adder and an output signal of the fourth delay circuit;
    a second subtracter for implementing subtraction between an output signal of the second adder and an output signal of the third adder;
    a first sign change circuit for inverting a sign of an output signal of the first subtracter;
    a first selector for periodically and alternately selecting one of the output signal of the first subtracter and an output signal of the first sign change circuit;
    a second sign change circuit for inverting a sign of an output signal of the second subtracter;
    a second selector for periodically and alternately selecting one of the output signal of the second subtracter and an output signal of the second sign change circuit; and
    means for generating two different color-difference signals in response to an output signal of the first selector and an output signal of the second selector.

3. A color image pickup apparatus comprising:
    a photo-to-electric conversion section subjected to progressive scanning;
    a first delay circuit for delaying an output signal of the photo-to-electric conversion section by a time equal to one horizontal scanning period;
    a first adder for adding the output signal of the photo-to-electric conversion section and an output signal of the first delay circuit;
    a second delay circuit for delaying the output signal of the first delay circuit by a time corresponding to one pixel;
    a second adder for adding the output signal of the photo-to-electric conversion section and an output signal of the second delay circuit;
    a third delay circuit for delaying an output signal of the first adder by a time corresponding to one pixel;
    a first subtracter for implementing subtraction between the output signal of the first adder and an output signal of the third delay circuit;

a fourth delay circuit for delaying an output signal of the second adder by a time correspond to one pixel;

a second subtracter for implementing subtraction between the output signal of the second adder and an output signal of the fourth delay circuit;

a first sign change circuit for inverting a sign of an output signal of the first subtracter;

a first selector for periodically and alternately selecting one of the output signal of the first subtracter and an output signal of the first sign change circuit;

a second sign change circuit for inverting a sign of an output signal of the second subtracter;

a second selector for periodically and alternately selecting one of the output signal of the second subtracter and an output signal of the second sign change circuit; and means for generating two different color-difference signals in response to an output signal of the first selector and an output signal of the second selector.

4. A color image pickup apparatus comprising:

a photo-to-electric conversion section subjected to progressive scanning;

a first delay circuit for delaying an output signal of the photo-to-electric conversion section by a time equal to one horizontal scanning period;

a first adder for adding the output signal of the photo-to-electric conversion section and an output signal of the first delay circuit;

a second delay circuit for delaying the output signal of the first delay circuit by a time corresponding to one pixel;

a second adder for adding the output signal of the photo-to-electric conversion section and an output signal of the second delay circuit;

a third delay circuit for delaying the output signal of the photo-to-electric conversion section by a time corresponding to one pixel;

a third adder for adding the output signal of the first delay circuit and an output signal of the third delay circuit;

a fourth delay circuit for delaying an output signal of the first adder by a time corresponding to one pixel;

a first subtracter for implementing subtraction between the output signal of the first adder and an output signal of the fourth delay circuit;

a second subtracter for implementing subtraction between an output signal of the second adder and an output signal of the third adder;

a first sign change circuit for inverting a sign of an output signal of the first subtracter;

a first selector for periodically and alternately selecting one of the output signal of the first subtracter and an output signal of the first sign change circuit;

a second sign change circuit for inverting a sign of an output signal of the second subtracter;

a second selector for periodically and alternately selecting one of the output signal of the second subtracter and an output signal of the second sign change circuit; and means for generating two different color-difference signals in response to an output signal of the first selector and an output signal of the second selector.

* * * * *